United States Patent [19]
Laimins

[11] 3,712,123
[45] Jan. 23, 1973

[54] COMPOUND-PLATE STRAIN GAGE TRANSDUCER

[75] Inventor: Eric Laimins, Belmont, Mass.

[73] Assignee: BLH Electronics, Inc., Waltham, Mass.

[22] Filed: Jan. 7, 1971

[21] Appl. No.: 104,623

[52] U.S. Cl. .................................... 73/141 A, 338/5
[51] Int. Cl. ................................................ G01l 1/22
[58] Field of Search .......... 73/88.5 R, 141 A, 398 AR

[56] References Cited

UNITED STATES PATENTS

| | | | |
|---|---|---|---|
| 3,035,240 | 5/1962 | Starr | 73/88.5 R X |
| 3,168,718 | 2/1965 | Swartz et al. | 73/88.5 R X |
| 3,439,761 | 4/1969 | Laimins | 177/211 |

FOREIGN PATENTS OR APPLICATIONS 910,977   11/1962   Great Britain ..................... 73/141 A Primary Examiner—Charles A. Ruehl
Attorney—James E. Mrose and Mary C. Thomson

[57] ABSTRACT

A low-profile strain-gage transducer capable of operating accurately over relatively low force ranges includes as a main sensing element a compound flat plate and rib structure extending between radially spaced central and peripheral load-transmitting members, the compound structure having relatively stiff gaged ribs of doubly tapered wedge form in a symmetrical annular array wherein the ribs are angularly separated by relatively low-stiffness web or plate portions.

3 Claims, 5 Drawing Figures

PATENTED JAN 23 1973 3,712,123

INVENTOR.
BY ERIC LAIMINS

Thomson & Mrose
ATTORNEYS

COMPOUND-PLATE STRAIN GAGE TRANSDUCER

BACKGROUND OF THE INVENTION

The present invention relates to improvements in strain-gaged force measuring devices such as load cells and pressure transducers, and, in one particular aspect, to miniaturized sealed transducers of uncomplicated low-cost construction in which sensitive and accurate responses to relatively small loading forces are promoted by unique compound-configuration sensing elements having a symmetrical array of gaged ribs and interconnecting ungaged plate portions, the latter conveniently being formed with thicknesses and areas which determine the intended range of force measurements.

It has been well known in the art to sense elastic strains resulting from deformations of a circular diaphragm which is clamped or otherwise held fixed about its periphery, and to interpret the sensed strains in terms of the net loading force acting on the faces of the diaphragm. Commonly, such diaphragms have been made of substantially uniform thickness, and lend themselves particularly well to the measurement of differential pressures, the surface strains being conveniently sensed and translated into desired measurements by way of electrical resistance strain gages. Diaphragm elements have also been exploited in load cells which respond to applied mechanical forces, as described for example in my U.S. Pat. No. 3,130,382. Not all diaphragm-type sensing elements have been flat and of uniform thickness; in one differing construction described in U.S. Pat. No. 3,289,134, the diaphragm has thickened regions such as those appearing in a cross-section having the form of a flat-topped arch, for purposes of equalizing the tension and compression strains, and, in another type of construction described in the 1963 British Pat. No. 922,982 and in U.S. Pat. No. 3,213,400, the diaphragm element has a rigid central hub and an annular portion which is thicker about both its inner and outer peripheries, for purposes of developing tapered regions in which bending stresses are substantially constant. The double-taper concept has likewise found expression in beam-type sensing elements, such as appear in U.S. Pat. No. 3,168,718.

In the manufacture of various forms of strain-gage transducers it is generally important that size be minimized and that they be manufacturable economically to serve a number of force ranges. Double-taper constructions are attractive in that gage placements are relatively non-critical, and, where the sensing element is generated in an annular configuration, there are further advantages that unavoidable effects of unwanted side and torsion loadings may be inherently compensated or suppressed; however, such designs not readily and economically implemented in small sizes and rugged constructions for uses over a variety of low-force ranges. Accordingly, the present invention is aimed at overcoming these difficulties, and accomplishes that result by departing from conventional designs and introducing another which involves exploitations of the advantages offered by both double-tapered beams and by full annular diaphragms.

SUMMARY

By way of a summary account of practice of this invention in one of its aspects, a simple low-height load cell is fashioned from cylindrical metal stock having a desired modulus of elasticity, the cylinder being transformed into a cup-shaped element by rotary machining operations which leave a rigid outer periphery or rim and a substantially rigid central hub integrally connected with the rim by a less-rigid annular portion at the closed end. Preferably the exposed external surfaces of the annular portion are substantially flat, with the hub projecting axially outwardly to form a load-receiving portion, and the internal surfaces of the annular portion are doubly sloped, tapering from a thicker region near the hub to a thinner region radially intermediate the hub and rim, and thence tapering to a second thicker region radially nearer the rim. The construction as thus-far described is capable of responding satisfactorily to low-level forces only if the aforesaid thinner region and tapering are relatively weak and are of predetermined design for optimum response to the specific low-level forces to be measured. Fabrication is significantly improved when the double-sloped annular portion is instead left relatively thick, such as would be characteristic of any element serving the purposes only of a high-capacity cell, and the thick doubly sloped annular element is then transformed into a low-capacity element by drilling closed-bottom holes of predetermined depth one each at a plurality of angularly spaced position, symmetrically about the central axis, where they interrupt the aforesaid thinner region and also extend laterally through the tapering. Preferably, the holes are of the same diameter as the radial width of the annular portion, and the closed bottoms are of predetermined relatively small thickness which is nevertheless ample to afford mechanically-sound closures and, further, to maintain sufficient full web or diaphragm strength to overcome torsion and side-loading weaknesses. Electrical-resistance strain gages are bonded to the internal sloping surfaces of rib-like undrilled parts of the annular portion, within the radial spans of the holes, for responses to tension and compression effects brought about by all the loading except for negligible amounts which may be by-passed through the ungaged closures at the bottoms of the holes.

It is one of the objects of the present invention to provide novel and improved force transducers of miniaturized rugged, economical and uncomplicated constructions which operate efficiently and accurately, especially over relatively low ranges of forces.

Another object is to provide a unique strain-gage transducer in which the strain-sensing element is in a compound annular plate form established by a symmetrical array of doubly tapered radial ribs annularly separated by relatively low-rigidity diaphragm portions.

A further object is to provide a low-profile low-capacity load cell in which a compound annular sensing element includes both tapered radial ribs and flat thin diaphragm portions cooperating to form a sealed high-precision unit which is highly insensitive to spurious loadings.

BRIEF DESCRIPTION OF THE DRAWINGS

Although the features of this invention which are considered to be novel are set forth in the appended claims, further details as to preferred embodiments, as well as to further objects and advantages, may be most readily perceived through reference to the following description taken in connection with the accompanying drawings, wherein:

DESCRIPTION OF THE PREFERRED EMBODIMENTS

Figure 1:
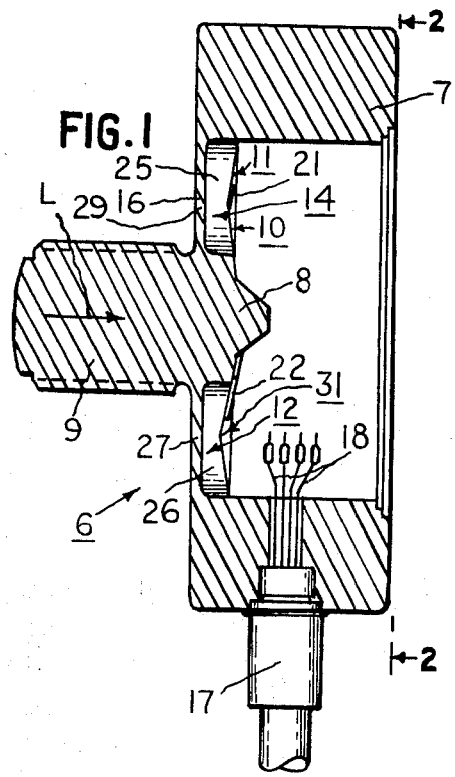
FIG. 1 is a transverse cross-section of an improved load-cell element having a compound annular plate expressing the present teachings.
Figure 2:
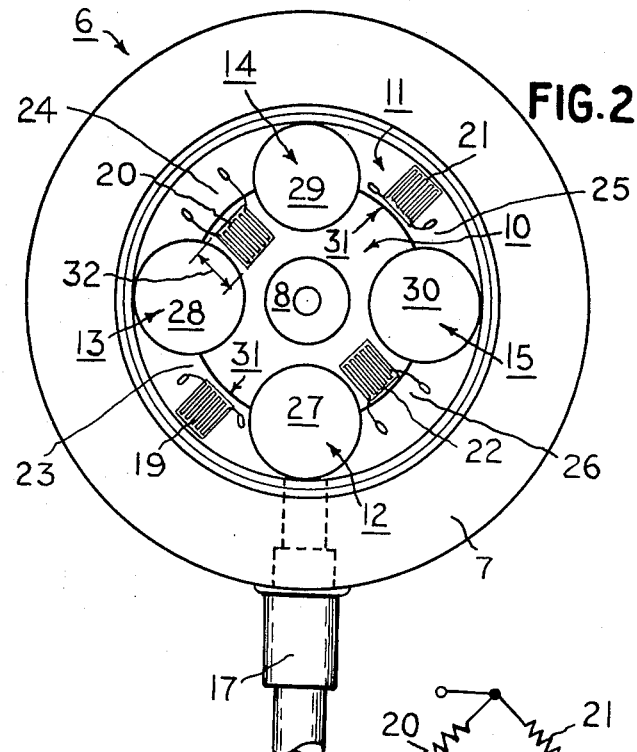
FIG. 2 provides an end view of the element of FIG. 1.

The transducer structure 6 appearing in FIG. 1 and 2 is intended for use as a main structural component of a load cell assembly, and its integral high-modulus-of-elasticity metal portions serve a number of purposes. Circularly generated configurations of the rigid annular outer load-transmitting rim portion 7, of the rigid hub portion 8, of the rigid load-transmitting externally threaded mechanical connector 9, of the double-sloping rib portions 10 and 11, and of the four closed-end holes 12–15, all lend themselves to fabrication conveniently by way of rotary machining techniques. Rim 7 serves as one support, and the compound annular plate portion 16, made up of the aforesaid rib portions and of diaphragm or web portions at the bottoms of the aforesaid holes, serves as one closure for the cell, as well as constituting a deformable load-sensing element. An electrical connector 17 extending radially into rim 7 is associated with electrical leads 18 disposed for connection with four electrical-resistance strain gages 19–22 bonded to certain of the sloping surfaces of the rib portions. The entire cell is intended to have its interior sealed by way of a circular plate (not shown) fitted across the open end of rim 7.

Oppositely sloping rib portions 10 and 11 cause the compound annular plate portion 16 to have variable thicknesses in the radial directions at the sites of the four relatively strong ribs 23 – 26 appearing between the four symmetrically arrayed holes 12 – 15. Specifically, these ribs decrease in thickness, in direction radially outwardly from hub 8, reaching a minimum thickness about midway of the annular portion 16, and from there increase in thickness toward their mergers with rigid outer rim 7. The slopes may be about the same, and are respectively identical for all ribs. The thicknesses, and hence strengths, of ribs 23 – 26 are such that, absenting holes 12 – 15, the annular portion 16 would elastically deform only very slightly under relatively small loading applied in the direction of arrow L (FIG. 1), and the cell could not then be used to sense low-range loads, such as those down to about 100 pounds. For the latter purposes, the annular portion could simply be made thin, of course, but then it would not properly respond to and withstand a wide range of loading extending to much higher levels, and its delicacy would render it highly susceptible to damage and unduly sensitive to undesirable side and torsion loadings. These difficulties are offset by interrupting the doubly sloped and relatively large thicknesses of annular portion 16 by the closed-bottom blind holes 12 – 15, the effects of which are both to govern the angular widths of the ribs 23 – 26 and to leave relatively thin webs or membranes 27 – 30 between the ribs. These ribs then deform elastically not only in accordance with their thickness in radial directions but also in accordance with their angular widths, all as modified by the load-carrying effects of the remaining webs 27 – 30. The latter effects are minimized by drilling or otherwise forming the holes 12 – 15 so that the closed ends or webs 27 – 30 are relatively thin in relation to the rib thicknesses. Webs 27 – 30 are themselves ungaged, and serve to provide the compound plate with important membrane characteristics which promote resistance to torsion other eccentric loadings; at the same time, these webs contribute to the sealing of the interior of the cell.

The number of holes such as holes 12 – 15 may be varied, depending upon cell design requirements, and they may be other than circular. In the latter connection, for example, where the angular widths of the ribs 23 – 26 are to be lessened or increased, each of the holes may be comprised of side-by-side intersecting circular drilled holes, aligned in angular or radial directions, respectively. Preferably, the holes 12 – 15 extend radially for about equal distances on either side of the minimum-thickness region 31 of the ribs, and span the radial lengths along which the strain gages lie. Having reference to gage 20, for example, its effective radial grid length 32 is not greater than the radial span of adjoining holes 13 and 14, such that all of the gage actively responds to tension effects along the radially inner surface of the rib 24. The lengths of compression gages 21 and 19 are similarly shorter than the radial spans of the surfaces 11 which are intercepted by the holes.

As load is applied in direction L, the sloping surfaces 10 and 11 of the ribs 23 – 26 exhibit related tension and compression effects, and these are sensed by the attached strain gages 19 – 22. A typical electrical bridge arrangement for such gages appears in FIG. 3, wherein the compression gages 19 and 21 are in opposite diagonal arms and the tension gages 20 and 22 are in the remaining opposite diagonal arms, electrical excitation being applied across one pair of bridge corners and load-related electrical outputs being taken from across the other pair of bridge corners. In an alternative construction, strain gages may be applied to both sloping surfaces of each rib.

Figure 3:
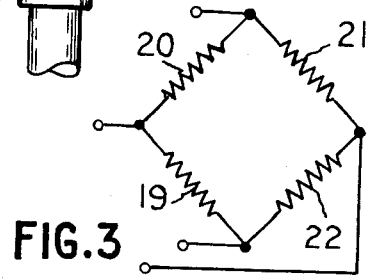
FIG. 3 schematically illustrates a bridge interconnection of strain gages employed with the element of FIGS. 1 and 2.
Figure 4:
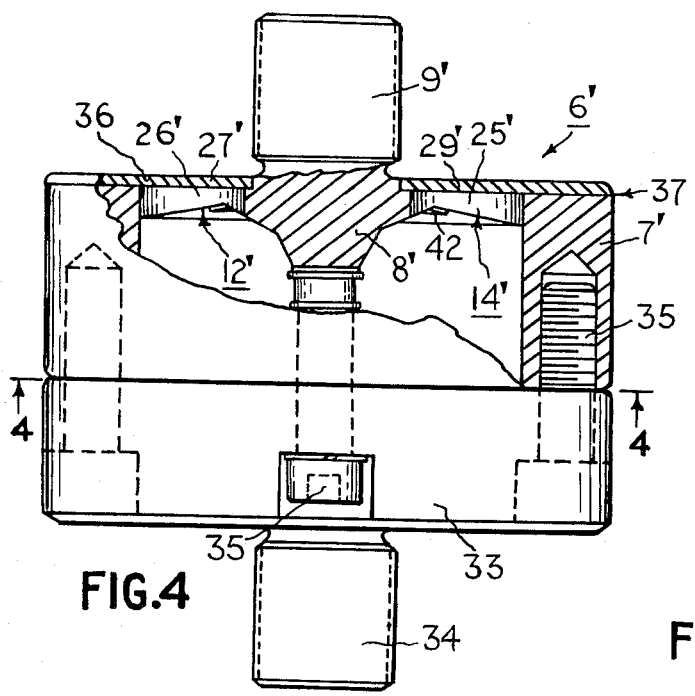
FIG. 4 depicts a double-ended load cell, with portions broken away to expose cross-sectioned details of another cell element construction.

The load cell embodiment represented in FIGS. 3 and 4 is designed for either tension or compression installations, and is therefore equipped with a tension fitting 33 and an associated central mechanical connector 34. The upper half of that cell corresponds generally to the cell illustrated in FIGS. 1 and 2, and functionally similar parts are therefore designated by the same reference characters, with distinguishing single-prime accents being added. Bolts 35 secure fitting 33 to the cell rim 7', in a closing relationship. In this construction, the openings such as 12' – 14', which alternate with the doubly-tapered ribs 23' – 26', are through holes, initially, and the desired web or membrane portions such as 27' – 29' are formed by the addition of a relatively thin plate 36 atop the ribs. Plate 36 may be brazed or otherwise secured in place, along the junction 37, and may include a central opening permitting it to be placed in position about the connection 9'. Strain gages such as gages 38 – 44 are applied to both sloping surfaces 10' and 11' of each rib, responding appropriately to both the tension and compression effects exhibited by each rib as the cell undergoes loading in either tension or compression.

Figure 5:
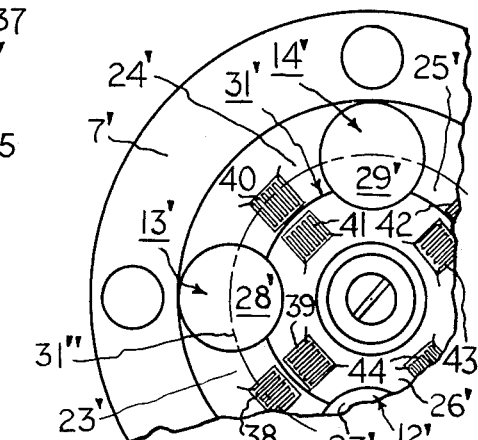
FIG. 5 depicts a fragment of a cell element of FIG. 4, taken along section line 5—5 in FIG. 4.

In the construction of the load cell of FIGS. 4 and 5, the minimum-thickness region 31' of the ribs is not radially midway between the hub and rim, and, instead, extends angularly between the angularly closest portions of adjacent circular holes. This brings the region 31' radially closer to the hub than a circular line 31" connecting the centers of the holes, and that closer location is optimum because the angular widths of the oppositely sloping gaged parts of the ribs are then more nearly alike. The gages in FIG. 5 are shown somewhat longer than optimum, for clarity, although, it should be understood that their grid lengths are preferably shorter than the related radial spans inwardly of the nearby holes. Fitting 33 may also be made as an active load cell element, after the manner of assembly 6'.

Load cells of the type described may function as pressure transducers, and in such cases the mechanical connector 9 is unnecessary, the flat compound plate serving to receive fluid pressures directly. In yet other forms of transducers and cells, the configurations of parts and holes need not be circular, nor need the web or membrane portions be flat. Accordingly, it should be understood that the specific preferred embodiments and practices described and illustrated herein have been presented by way of disclosure rather than limitation, and that those skilled in the art will appreciate that various modifications, combinations and substitutions may be effected without departure from the spirit and scope of this invention in its broader aspects and as set forth in the accompanying claims.

What I claim as new and desire to secure by Letters Patent of the United States is:

1. A strain gage transducer comprising first and second substantially rigid parts disposed in spaced relationship for relative movement along a predetermined path in response to loadings transmitted therethrough, elastically deformable compound plate means united with and extending between said parts and maintaining said parts in said spaced relationship, said plate means including material of non-uniform thickness which is thicker at spaced positions where it is united with said parts and tapers to a lesser thickness between said positions, said material of said plate means being subdivided into a plurality of ribs extending between said parts and laterally spaced from one another by holes each closed by a substantially uniform-thickness web, all of said plurality of ribs being of substantially the same proportions and having substantially the same lateral spacing between adjacent ribs, said web being thinner than said ribs and of substantially uniform thickness, the lesser-thickness regions of said ribs being substantially aligned with one another and the spaces between adjacent ones of said ribs extending between the lesser-thickness regions and between at least part of the tapered portions of adjacent ribs, said spaces comprising machined holes all of substantially the same dimensions, and electrical strain gages affixed to surfaces of tapered portions of said ribs which are separated from like surfaces of adjacent ribs by said holes, whereby load-induced relative displacements between said parts occasion related measurement responses by said strain gages and whereby elastic deformations of said ribs and responses by said strain gages are related to lateral widths of said ribs between said holes.

2. A strain gage transducer comprising a substantially rigid hub and a spaced surrounding rim, elastically deformable compound plate means united with and extending substantially radially between said rigid hub and rim, said plate means including material of non-uniform thickness which is thicker at radially inner and outer positions where it is joined with said hub and said rim and tapers to a lesser thickness radially between said positions, said material of said plate means being subdivided into a plurality of substantially radial ribs angularly spaced from one another by holes each closed by a substantially uniform-thickness web, said ribs and holes being in a symmetrical array angularly about a central axis of said plate means and hub, said ribs being integral with said hub and rim, said plate means being subdivided into said plurality of angularly-spaced ribs by cylindrical blind holes machined into the said material, said plate means being substantially flat on one side with the webs comprising closed bottoms of said blind holes which are integral with said ribs, the spacings of said ribs by said holes extending between adjacent regions of adjacent ones of said ribs which include said lesser thickness and at least part of the radially extending tapered portions of said ribs, all of said ribs having substantially the same widths angularly about said axis, said webs being thinner than said ribs and of substantially uniform thickness, the lesser-thickness regions of said ribs being substantially aligned angularly about said axis, and electrical strain gages affixed to surfaces of tapered portions of said ribs which are separated from like surfaces of adjacent ribs by said holes, whereby load-induced relative displacements between said hub and rim occasion related measurement responses by said strain gages and whereby elastic deformations of said ribs and responses by said strain gages are related to angular widths of said ribs.

3. A strain gage transducer comprising a substantially rigid hub and a spaced surrounding rim, elastically-deformable compound plate means united with and extending substantially radially between said rigid hub and rim, said plate means including material of non-uniform thickness which is thicker at radially inner and outer positions where it is joined with said hub and said rim and tapers to a lesser thickness radially between said positions, said material of said plate means being subdivided into a plurality of substantially radial ribs angularly spaced from one another by holes each closed by a substantially uniform-thickness web, said ribs and holes being in a symmetrical array angularly about a central axis of said plate means and hub, said ribs being integral with said hub and rim, said plate means being subdivided into said plurality of ribs by holes machined into the said material, each of said holes being substantially cylindrical, said holes extending between adjacent regions of adjacent ones of said ribs which include said lesser thickness and at least part of the radially extending tapered portions of said ribs, all of said ribs having substantially the same widths angularly about said axis, the closures of said holes being by web material of substantially the same thickness and less than thickness of said ribs, said lesser thickness of said ribs being substantially aligned with the narrowest portions of said ribs between adjacent holes, and electrical strain gages affixed to surfaces of tapered portions of said ribs which are separated from like surfaces of adjacent ribs by said holes, whereby load-induced relative displacements between said hub and rim occasion related measurement responses by said strain gages and whereby elastic deformations of said ribs and responses by said strain gages are related to angular widths of said ribs.

* * * * *